Sept. 6, 1966  D. L. MORGAN ETAL  3,270,771

RESILIENT DISC CHECK VALVE

Filed June 11, 1963

INVENTORS
DAVID L. MORGAN
HAROLD F. SNIDER AND
FRANK V. MINGRONE

BY *Robert L. Marben*

ATTORNEY

United States Patent Office 3,270,771
Patented Sept. 6, 1966

3,270,771
RESILIENT DISC CHECK VALVE
David Luke Morgan, Shelton, Harold F. Snider, Orange, and Frank Vincent Mingrone, Milford, Conn., assignors to Robertshaw Controls Company, Richmond, Va., a corporation of Delaware
Filed June 11, 1963, Ser. No. 287,005
8 Claims. (Cl. 137—525.3)

The invention presented herein relates to check valves and valve element.

An object of the invention is to provide a novel valve element formed of resilient material which is stretched radially when assembled in a valve structure and is so formed that the valve element is self-biased to a closed position in the valve structure.

Another object is to provide a check valve structure which does not use a separate member for biasing the valve element to a closed position.

Another object is to provide a check valve structure in which the area acted upon by the fluid pressure needed to open the valve is outside the valve seat and can be easily varied without altering the size of the sealing area or valve seat, or the configuration of the valve element used.

A further object is to provide a check valve structure using the valve element of this invention which has easily produced flat areas instead of fine beads or other intricate molded shapes which are difficult to produce because of the possibble entrapment of dust or other particle contaminates in the small cavities of molds.

Still further object is to provide a novel check valve structure which is easily assembled and disassembled to enable the end user of the valve structure to easily clean or replace the valve element.

The invention will best be understood by referring to the following description taken in connection with the accompanying drawings in which.

Figure 4:
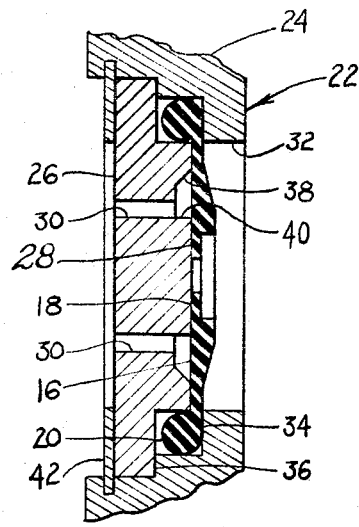
FIG. 4 is a sectional view of the valve structure with only a portion of the valve member in which the valve structure is assembled being shown.
Figure 2:
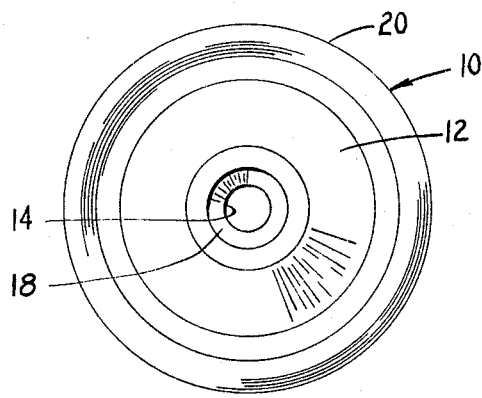
FIG. 2 is a view of the right face of the valve element as viewed in FIG. 1.
Figure 3:
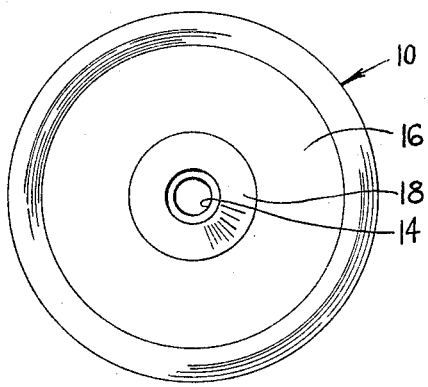
FIG. 3 is a view of the other face of the valve element.

Referring to the drawings, the valve element 10 is shown separate from the valve structure since its form changes when assembled as a part of a valve structure such as shown in FIG. 4. The valve element 10 has a disc-shaped portion 12 having a central opening 14. The portion 12 is tapered with its thickest portion adjacent the opening 14. One face of the portion 12 which is identified by the numeral 16 is flat. A thin annular lip 18 is formed as an integral portion of the valve element. The lip extends radially inward from the disc-shaped portion 12 and away from the face 16 with one surface of the lip being an extension of the surface of face 16. An integral bead 20 is provided at the periphery of portion 14. This bead serves to position the valve element and provides a seal at the periphery of the element when assembled as a part of a valve structure.

FIG. 4 shows a valve structure 22 using the valve element 10 as one component. The valve structure, in addition to the valve element, includes the wall 24 of a container or the like requiring the use of a check valve and a plug 26 for positioning and securing the element 10 in place. The plug provides a valve seat 28 for the structure and has a plurality of holes 30 which extend through the plug so the element 10 can respond to the pressure existing on the left-hand side of the wall 24.

Figure 1:
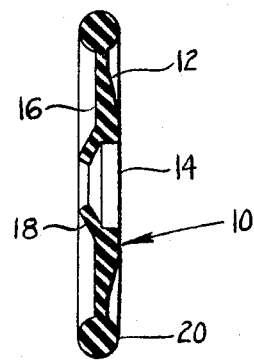
FIG. 1 is a sectional view of the valve element.

The wall 24 has an opening 32 and is counterbored to form a shoulder 34 and a shoulder 36. The bead 20 of element 10 is received by the shoulder 34 while plug 26 is received by shoulder 36. Plug 26 has an annular boss 38 spaced from the periphery of plug 26 which with the peripheral flange portion of plug 26 and shoulder 34 forms an annular channel for bead 20. The face of boss 38 engages a small area of face 16 of element 10 adjacent the bead 20 to hold the bead in sealing relationship with the shoulder 34. It should be noted that the bead 20 is deformed from its free position as shown in FIG. 1 when it is secured in position by the plug 26 causing the element 10 to be stretched radially. The bead 20 is twisted so that the portion in contact with shoulder 24 appears as a smooth continuation of the face of portion 12 opposite face 16.

The plug 26 also has a central boss 40 the face of which contacts the valve element 10. The face of boss 40 in contact with element 10 is flat and engages a portion of the flat face 16 and the adjacent surface of lip 18. The boss 40 thus provides the valve seat 28 for the structure. The radial stretching of element 10 and the deformation of lip 18 from its free position as shown in FIG. 1 biases the lip 18 against the face of boss 40 causing a leak-tight seal to be provided at the face of boss 40 for low differential pressures. Increasing pressure on the right-hand side of the valve structure as viewed in FIG. 4 increases the sealing characteristics of the valve since such increase in pressure causes the valve element 10 to be depressed so that further sealing is effected between the edge of boss 40 and the face 16 of element 10. The valve, of course, opens when the pressure on the left side of the structure is greater than the pressure on the right side. The differential pressure causes the lip 18 to be flexed as well as portion 12 at its thin outer edge to cause the valve to open to permit fluid flow through the holes 30 and then through the central opening 14. In the plug illustrated, the pressure differential for opening the valve is on the order of one inch of mercury.

It should be noted that the area which is acted on by the fluid pressure to produce the opening force for the valve is acting outside the valve seat. Thus, by controlling the spacing between boss 38 and boss 40, the area acted on by the fluid pressure to produce the opening force for the valve can be readily enlarged or reduced to change the differential pressure needed for operation. The fact that the face 16 of the valve element 10 is flat makes such an adjustment an easy matter since the face 16 will readily conform to any changes in the areas of the adjacent surfaces of boss 38 and boss 40 which could be altered to change the area of element 10 exposed to the fluid pressure for opening the valve.

The plug 26 must be held in place in some manner. In the embodiment illustrated it is shown held in place by a separate retaining ring 42 which snaps into a groove formed in the wall of opening 32. The plug 26, of course, can be secured in place in other well known ways such as by keying the plug to the wall 24 which makes it possible to secure the plug in place by partial rotation of the plug after it has been positioned relative to the element 10. It would also be possible to secure plug 26 by threaded engagement of the plug with wall 24.

The leaking problems are reduced by the valve element 10 since in addition to being molded of resilient material such as rubber, neoprene or the like, flat areas are used instead of fine beads or other intricate molded surfaces which are difficult to produce because of the possible entrapment of dust or other particle contaminates in the small cavities of molds.

A typical application of the valve structure described is its use as the so-called snifter valve in an air volume control for domestic water well systems. The air volume control is used to maintain the proper quantity of air in the storage tank of such a system.

What is claimed is:

1. A resilient valve element comprising a disc-shaped portion having a central opening, the thickness of said portion varying inversely with the radial distance from said opening, one side of said portion presenting a flat surface; an integral flexible annular lip extending radially inward from said portion at said opening, one side of said lip being an extension of said flat surface and extending outwardly from said surface and an integral bead at the periphery of said disc-shaped portion.

2. A resilient valve element comprising a disc-shaped portion having a central opening, the thickness of said portion adjacent said opening being greater than the thickness of said portion at its periphery, one side of said portion presenting a flat surface; an integral thin flexible annular lip extendnig radially inward from said portion, one side of said lip being an extension of said surface and extending outwardly from said surface and an integral bead at the periphery of said disc-shaped portion.

3. A resilient valve element comprising a tapered circular portion having a central opening, the thickness of said portion adjacent said opening being greater than the thickness of said portion at its periphery, one side of said portion presenting a flat surface, said surface defining a plane which is substantially perpendicular to the axis of said opening; an integral thin flexible annular lip extending radially inward from said portion and outwardly from said plane, one side of said lip being a continuation of said surface and an integral bead at the periphery of said disc-shaped portion.

4. A resilient valve element comprising a tapered circular portion having a central opening with the thickness of said portion at its periphery being less than its thickness at said opening, one side of said portion presenting a flat surface; an integral annular lip extending radially inward of said opening and outwardly from said surface, one side of said lip being a continuation of said surface and an integral flexible annular bead at the periphery of said circular portion, said bead being greater in thickness than said circular portion at its periphery.

5. A resilient valve element comprising a tapered circular portion having a central opening with the thickness of said portion at its periphery being less than its thickness at said opening, one side of said portion presenting a flat surface; an integral flexible annular lip extending radially inward of said opening and outwardly from said surface, one side of said lip being a continuation of said surface and an integral annular bead at the periphery of said circular portion, said bead being greater in thickness than said circular portion at its periphery and extending beyond each side of said portion.

6. A check valve structure including a member having a counterbored opening, a valve element of resilient material having a central opening, said element having a disc-shaped portion with an integral flexible annular lip at said opening, said lip prior to assembly as part of the structure extending radially inward and away from said portion, said element having an integral bead at the periphery of said portion, a plug securing said element in place within said counterbored opening, said plug having an annular boss which engages said element adjacent said bead whereby said element at said bead is held in sealing relationship with said plug and said member, said plug having a central boss spaced from said annular boss which engages and positions said lip whereby said lip is biased against said central boss to form a seal for said central opening and said plug having an opening extending through said plug to the space between said central boss and said annular boss whereby said seal for said central opening may be broken by a differential pressure existing across said central opening and said opening in said plug.

7. A check valve structure including a member having a counterbored opening, a valve element of resilient material having a central opening, said element having a disc-shaped portion with an integral flexible annular lip at said opening which in its free position extends radially inward and away from said portion, said element having an integral bead at the periphery of said portion, a plug having an annular boss which engages said element adjacent said bead whereby said element at said bead is held in sealing relationship with said plug and said member within said counterbored opening and said element is stretched radially, said plug having a central boss spaced from said annular boss which engages and alters the free position of said lip whereby said lip is biased against said central boss by the altered position of said lip and the radial stretching of said element to form a seal for said central opening and said plug having an opening extending through said plug to the space between said central boss and said annular boss whereby said seal for said central opening may be broken by a differential pressure existing across said central opening and said opening in said plug.

8. A check valve structure including a member having a counterbored opening, a valve element of resilient material having a central opening, said element having a disc-shaped portion the thickness of which is greater at said opening than at its perphery with an integral flexible annular lip extending radially inward and away from said portion, one side of said portion presenting a flat surface adjacent said lip, said element having an integral bead at the periphery of said portion, a plug securing said element in place within said counterbored opening, said plug having an annular boss which engages said element adjacent said bead whereby said element at said bead is held in sealing relationship with said plug and said member, said plug having a central boss spaced from said annular boss, said boss having a flat face which engage said lip and at least a portion of said surface whereby said lip is biased against said central boss to form a seal for said central opening and said plug having said opening extending through said plug to the space between said central boss and said annular boss whereby said seal for said central opening may be broken by a differential pressure existing across said central opening and said opening in said plug.

References Cited by the Examiner
UNITED STATES PATENTS

| | | | |
|---|---|---|---|
| 465,013 | 12/1891 | Bourdil | 137—525.3 X |
| 3,027,915 | 4/1962 | Huffman | 137—525.3 |
| 3,073,339 | 1/1963 | Stelzer | 137—525 X |

WILLIAM F. O'DEA, *Primary Examiner.*

D. ZOBKIW, *Assistant Examiner.*